United States Patent
Spanke

(10) Patent No.: US 9,891,141 B2
(45) Date of Patent: Feb. 13, 2018

(54) MEASURING DEVICE OF PROCESS AUTOMATION TECHNOLOGY

(71) Applicant: Endress + Hauser GmbH + Co. KG, Maulburg (DE)

(72) Inventor: Dietmar Spanke, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 366 days.

(21) Appl. No.: 14/430,307

(22) PCT Filed: Aug. 28, 2013

(86) PCT No.: PCT/EP2013/067787
§ 371 (c)(1),
(2) Date: Mar. 23, 2015

(87) PCT Pub. No.: WO2014/048662
PCT Pub. Date: Apr. 3, 2014

(65) Prior Publication Data
US 2015/0241315 A1    Aug. 27, 2015

(30) Foreign Application Priority Data
Sep. 25, 2012   (DE) .................. 10 2012 109 010

(51) Int. Cl.
*G05B 19/401*   (2006.01)
*G05B 21/02*   (2006.01)
*G01M 99/00*   (2011.01)

(52) U.S. Cl.
CPC ......... *G01M 99/008* (2013.01); *G05B 19/401* (2013.01); *G05B 21/02* (2013.01);
(Continued)

(58) Field of Classification Search
CPC ................. G05B 19/401; G05B 21/02; G05B 2219/37033; G05B 2219/34437; G05B 2219/42263; G01M 99/008
See application file for complete search history.

(56) References Cited

U.S. PATENT DOCUMENTS 5,416,723 A * 5/1995 Zyl ........................ G06F 1/30
                                                        713/300
6,014,100 A    1/2000 Fehrenbach
(Continued)

FOREIGN PATENT DOCUMENTS

| CN | 1961217 A | 5/2007 |
|----|-----------|--------|
| CN | 102272692 A | 12/2011 |

(Continued)

OTHER PUBLICATIONS

German Search Report, German Patent Office, Munich, DE, dated Jun. 14, 2013.
(Continued)

*Primary Examiner* — Bryan Bui
(74) *Attorney, Agent, or Firm* — Bacon & Thomas, PLLC

(57) ABSTRACT

A measuring device of process automation technology for measuring at least one process variable of a medium. A control unit is provided, which measures the process variable at least with a predeterminable clock rate and provides the result of such measurement as a measured value. Associated with the clock rate is an energy requirement of the measuring device, wherein a display/service unit is provided, which shows the measured value and/or enables servicing of, respectively parameter input to, the measuring device. The display/service unit of the control unit of the measuring device switches from a measuring mode into a service mode, wherein in the service mode the control unit measures the process variable with a first clock rate, wherein in the measuring mode the control unit measures with a
(Continued)

second clock rate, and wherein the first clock rate and the second clock rate are fixed in such a manner that the second clock rate is greater than the first clock rate and the total energy requirements of the measuring device in the service mode and in the measuring mode are equal.

7 Claims, 1 Drawing Sheet

(52) U.S. Cl.
CPC ............. *G05B 2219/34437* (2013.01); *G05B 2219/37033* (2013.01); *G05B 2219/42263* (2013.01)

(56) References Cited

U.S. PATENT DOCUMENTS

| 6,512,358 | B2 | 1/2003 | Klofer |
| 7,174,260 | B2 | 2/2007 | Tuff et al. |
| 7,558,687 | B1 | 7/2009 | Bode |
| 7,620,505 | B2 | 11/2009 | Froehlich |
| 7,653,508 | B1 | 1/2010 | Kahn |
| 7,729,885 | B2 | 6/2010 | Mehendale |
| 9,268,386 | B2 | 2/2016 | Cheng et al. |
| 2007/0241203 | A1 | 10/2007 | Wagner et al. |

FOREIGN PATENT DOCUMENTS

| DE | 10034684 A1 | 1/2002 |
| DE | 102004044606 A1 | 3/2006 |
| EP | 1301914 B1 | 3/2004 |
| EP | 2034281 A1 | 3/2009 |
| GB | 2453325 A | 4/2009 |
| WO | 2004046658 A1 | 6/2004 |
| WO | 2006029947 A1 | 3/2006 |

OTHER PUBLICATIONS

International Search Report, EPO, The Netherlands, dated Oct. 22, 2013.
English Translation of the International Preliminary Report on Patentability, WIPO, Geneva, CH, dated Apr. 9, 2015.

* cited by examiner

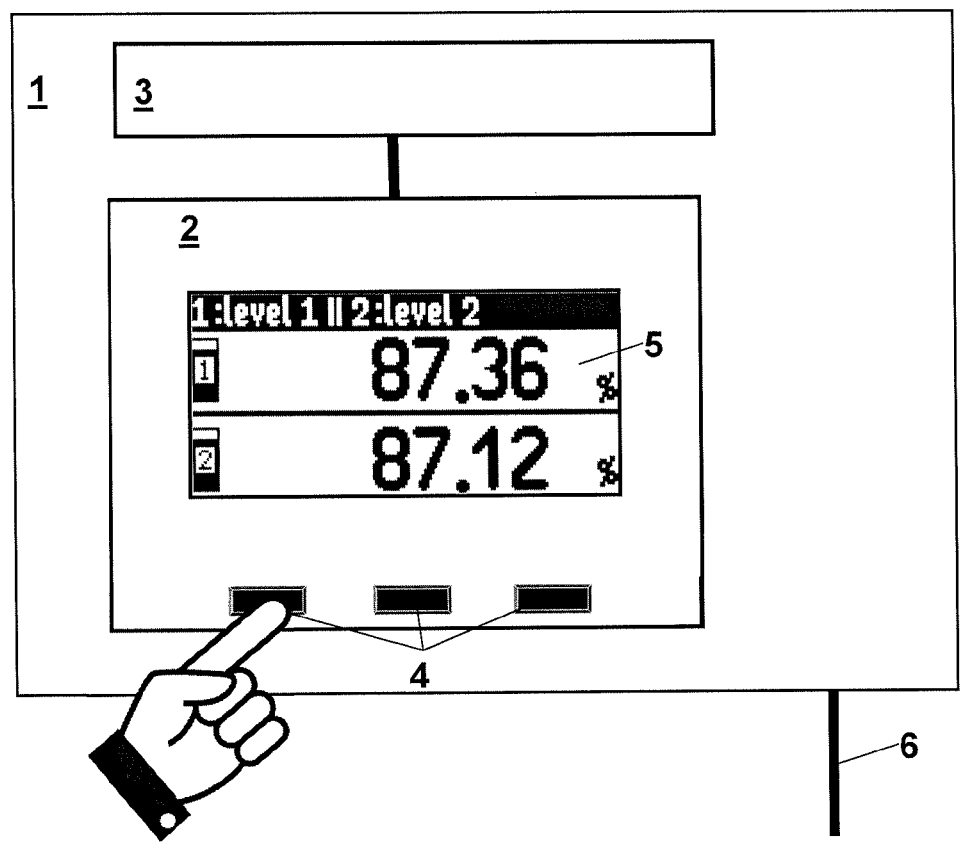

MEASURING DEVICE OF PROCESS AUTOMATION TECHNOLOGY

TECHNICAL FIELD

The invention relates to a measuring device of process automation technology for measuring at least one process variable of a medium, wherein a control unit is provided, which measures the process variable at least with a predeterminable clock rate and provides the result of such measurement as measured value, wherein associated with the clock rate is an energy requirement of the measuring device, wherein a display/service unit is provided, which shows the measured value and/or enables servicing of, respectively parameter input to, the measuring device.

BACKGROUND DISCUSSION

The measuring devices, the measuring apparatuses or also the sensors of process automation technology monitor or measure process variables of media, which, depending on the type of process—e.g. the synthesizing of a medium—are subject to greater changes in relatively less time. Such dynamic processes require that the time intervals between individual measured values should be as small as possible. Thus, measurement should be as often as possible, in order to obtain an appropriate time resolution. For this, however, there is the problem of the energy requirement for the measurements, wherein a higher accuracy of measurement is usually associated with an increased energy requirement. In the case of 4 to 20 mA measuring devices, the energy is, in principle, limited. Depending on the embodiment, however, also components—e.g. power supplies—for higher powers are correspondingly more complicated or also costly. Thus, it is quite difficult to increase the number of the measurement data or measurement points. Another limiting factor is the physical measuring principle, which is applied and which, thus, also provides a lower limit for the time resolution. It can also occur that a higher time resolution is not continually required, because e.g. the measured process is, at times, steady. The need can thus be different, depending on process conditions.

Furthermore, the measuring device also requires energy for representation of the measured value on a display or for servicing and/or parameter input via a service unit.

The trend in measurements technology is to embody measuring devices such that they work as energy efficiently as possible: Four-wire measuring devices are being replaced in increasing measure by two-wire measuring devices. In the case of two-wire measuring devices—in contrast to four-wire measuring devices energy supply and measured value transmission occur via one and the same line-pair.

Two-wire measuring devices must be so designed relative to their power requirement that they always can be operated with the currently available power. Known from European Patent, EP 1 301 914 B1 is a two-wire microwave measuring device with clocked measuring rate. In the case of this known measuring device, the measuring rate is optimized such that a next measuring is started only when sufficient energy is available for such.

Described in Published International Application, WO 2004 046 6658 A1 is an ultrasonic, flow measuring device with a control/evaluation unit, which has a number of components, of which at least one has a high power consumption. This component, e.g. an amplifier, an ND converter, a microprocessor, is operated intermittently in rest and measuring phases.

Known from U.S. Pat. No. 6,014,100 is a two-wire radar measuring device with constant clocking of the measuring rate, which turns off at the worst or most unfavorable acceptable case (worst case) and works at the lower power limit: The constant clock rate of measurement is so designed over the total measuring range that in the case of minimum available power, thus in the case of a 4 mA signal, there is still sufficient power for the next measuring.

Of course, it is also in the case of this known solution problematic, how to provide customers with supplemental features in the servicing of the measuring device and the evaluation of the measured value. Moreover, a two-wire measuring device with constant measuring rate has, compared with a measuring device with variable measuring rate, the disadvantage that it has over almost the entire measuring range a lesser accuracy of measurement.

Besides two-wire measuring devices, which have per unit time only a limited amount of available energy, appearing increasingly in measurements technology are energy autarkic measuring devices. The terminology 'energy autarkic measuring devices' means measuring devices, which have no wired lines to a remote energy source of any kind. Energy autarkic measuring devices are supplied with energy e.g. via at least one battery, via radio, via solar cells or via fuel cells. In order that the duration of operation, e.g. life of the battery, be as high as possible, the measuring devices should be so embodied that they have a power consumption, which is as small as possible.

Due to the limited available energy, it is often difficult to offer customers two-wire measuring devices with so-called supplemental features. A classic example of a supplemental feature of measuring devices is an illuminated display, a touch-screen for simpler, intuitive input of parameter data or for intuitive servicing of the device.

SUMMARY OF THE INVENTION

An object of the invention is to provide a method, which enables improved, optimized operation of a process measuring device coupled with a steady energy requirement.

The invention achieves the object by means of a measuring device of process automation technology for measuring at least one process variable of a medium, wherein a control unit is provided, which measures the process variable at least with a predeterminable clock rate and provides the result of such measurement as a measured value, wherein associated with the clock rate is an energy requirement of the measuring device. A display/service unit is provided, which shows the measured value and/or enables the servicing of, respectively parameter input to, the measuring device, wherein the display/service unit switches the control unit of the measuring device from a measuring mode into a service mode. In the service mode the control unit measures the process variable with a first clock rate, wherein in the measuring mode the control unit measures with a second clock rate, and wherein the first clock rate and the second clock rate are fixed in such a manner that the second clock rate is greater than the first clock rate and total energy requirements of the measuring device in the service mode and in the measuring mode are approximately equal.

An advantageous embodiment of the measuring device of the invention includes that the display/service unit works in the service mode with a third clock rate for servicing, respectively parametering, the measuring device and in measurement operation with a fourth clock rate for representing the measured values on a display on the measuring device, wherein the third clock rate is greater than the fourth clock rate.

A further embodiment of the measuring device of the invention provides that in the service mode the decrease of the clocking of the control unit from the second clock rate to the first clock rate is proportional to the increase of the clocking of the display/service unit from the fourth clock rate to the third clock rate, so that the total energy requirement of the measuring device in the service mode remains equal.

A supplementing embodiment of the measuring device of the invention provides that in the measuring mode the increase of the clocking of the control unit from the first clock rate to the second clock rate is proportional to the decrease of the clocking of the display/service unit from the third clock rate to the fourth clock rate, so that the total energy requirement of the measuring device in the measuring mode remains equal.

In a special embodiment of the measuring device of the invention, it is provided that the display/service unit is embodied in such a manner that in the case of input to the display/service unit the measuring device switches from a measuring mode into a service mode.

In an additional embodiment of the measuring device of the invention, it is provided that the measuring device, automatically and/or as a function of time after terminating of input via the interaction elements of the display/service unit, switches back from the service mode into the measuring mode.

An especially helpful embodiment of the measuring device of the invention includes that the measuring device is associated via a two-wire cable or a fieldbus with a remote display/service unit or control station and automatically switches in the case of input to this remote display/service unit or remote control station from the measuring mode into the service mode.

BRIEF DESCRIPTION OF THE DRAWING

The invention will now be explained in greater detail based on the appended drawing, the sole FIGURE of which shows as follows:

FIG. 1 is a schematic first embodiment of a measuring device of the invention with the display/service unit.

DETAILED DISCUSSION IN CONJUNCTION WITH THE DRAWING

FIG. 1 shows the construction of a measuring device 1 of the invention with a display/service unit 2 and a two conductor interface, respectively fieldbus, 6.

A basic idea of the invention is that the measuring device 1 is operated in at least two different modes: A service mode and a measuring mode. The two modes differ from one another as regards the clock rates of the control unit 3 and the display/service unit 2. The clock rates of the control unit and the display/service unit 2 are, in such case, so selected that the respectively associated total energy consumptions of the measuring device 1 remain essentially equal. Thus, on the one hand, no additional energy is required for the operation of the measuring device 1 and, on the other hand, also, in each case, the provided energy is maximally utilized in the measuring device 1. In the service mode, the first clock rate of the control unit 3 of the measuring device 1 for performing and/or evaluating the measuring of the process variable is less than the second clock rate of the control unit 3 in the measuring mode. Thus, in the measuring mode, more measured values are measured than in the service mode, which simultaneously means that the time resolution is greater in the measuring mode. Thus, in the measuring mode, changes of the process variable can be better monitored with respect to time. By reducing to the first clock rate of the control unit 3 in the measuring device 1 for ascertaining the measured value, readily available energy is saved, which can be used, for example, for servicing the measuring device 1 via the display/service unit 2. The display/service unit 2 can, due to the higher, readily available energy, be operated with a higher rate of change of the information on the display 5, respectively a third clock rate, or the retrieval of the input from the interaction elements 4 can occur at a higher rate, respectively a third clock rate. Fundamentally, the energy, which is saved in the control unit 3 of the measuring device 1 by reducing to the first clock rate for measuring of the process variable, can be used back in the display unit 2, e.g. by increasing to the third clock rate for changing the information on the display 5 or for sampling the interaction elements 4. During the configuring or servicing of the measuring device 1, the high updating rate of the measured values is no longer as important as outside of the time interval, in which the measuring device 1 is configured. Instead, one would like to enable for customers a fast and simple servicing of the measuring device 1 during this time of servicing and/or configuring and in the remaining operating time enable a fast, exact measuring of the process variable by the measuring device 1.

The invention claimed is:

1. A measuring device of process automation technology for measuring at least one process variable of a medium, comprising:
    a control unit, which measures the process variable at least with a predeterminable clock rate and provides the results of such measurement as measured value; and
    a display/service unit, which shows the measured value and/or enables the servicing of, respectively parameter input via interaction elements to, the measuring device, wherein:
    associated with the clock rate is an energy requirement of the measuring device;
    in a service mode the control unit measures the process variable with a first clock rate and in a measuring mode with a second clock rate,
    the first clock rate and the second clock rate are fixed in such a manner that the second clock rate is greater than the first clock rate, so that in the measuring mode more measured values are measured than in the service mode;
    said display/service unit switches said control unit of the measuring device from a measuring mode into a service mode;
    said first clock rate and said second clock rate are fixed in such a manner that said second clock rate is greater than said first clock rate; and
    the total energy requirements of the measuring device in the service mode and in the measuring mode are approximately equal.

2. The measuring device as claimed in claim 1, further comprising:
    a display, wherein:
    said display/service unit works in the service mode with a third clock rate for servicing, respectively parametering, the measuring device and in measurement operation with said fourth clock rate for representing the measured values on a display on the measuring device; and said third clock rate is greater than said fourth clock rate.

3. The measuring device as claimed in claim 2, wherein:

in the service mode the decrease of the clocking of the control unit from said second clock rate to said first clock rate is proportional to the increase of the clocking of said display/service unit from said fourth clock rate to said third clock rate, so that the total energy requirement of the measuring device in the service mode remains equal.

4. The apparatus as claimed in claim 2, wherein:

in the measuring mode the increase of the clocking of said control unit from said first clock rate to said second clock rate is proportional to the decrease of the clocking of said display/service unit from said third clock rate to said fourth clock rate, so that the total energy requirement of the measuring device in the measuring mode remains equal.

5. The measuring device as claimed in claim 2, wherein:

display/service unit is embodied in such a manner that in the case of input to said display/service unit the measuring device switches from a measuring mode into a service mode.

6. The measuring device as claimed in claim 1, wherein:

the measuring device, automatically and/or as a function of time after terminating of input via interaction elements on said display/service unit, switches from the service mode into the measuring mode.

7. The measuring device as claimed in claim 1, wherein:

the measuring device is associated via a two-wire cable or a fieldbus with a remote display/service unit or control station and automatically switches in the case of an input to said remote display/service unit or remote control station from the measuring mode into the service mode.

* * * * *